United States Patent
Fontanella (10) Patent No.: US 8,391,329 B2
(45) Date of Patent: Mar. 5, 2013

(54) GAS LASER DISCHARGE PRE-IONIZATION USING A SIMMER-DISCHARGE

(75) Inventor: Joel Fontanella, Tolland, CT (US)

(73) Assignee: Coherent, Inc., Santa Clara, CA (US)

( * ) Notice: Subject to any disclaimer, the term of this patent is extended or adjusted under 35 U.S.C. 154(b) by 987 days.

(21) Appl. No.: 12/367,174

(22) Filed: Feb. 6, 2009

(65) Prior Publication Data

US 2012/0189031 A1   Jul. 26, 2012

Related U.S. Application Data

(60) Provisional application No. 61/147,199, filed on Jan. 26, 2009.

(51) Int. Cl.
*H01S 3/22* (2006.01)
*H01S 3/223* (2006.01)

(52) U.S. Cl. ............................................. 372/55; 372/57

(58) Field of Classification Search .............. 372/55–65
See application file for complete search history.

(56) References Cited

U.S. PATENT DOCUMENTS

| | | | |
|---|---|---|---|
| 4,443,877 A | 4/1984 | Chenausky et al. | |
| 4,451,766 A | 5/1984 | Angle et al. | |
| 4,507,788 A * | 3/1985 | Barnie et al. | 372/83 |
| 4,748,634 A | 5/1988 | Hesterman | |
| 4,837,772 A | 6/1989 | Laakmann | |
| 4,903,276 A | 2/1990 | Ross | |
| 5,123,028 A | 6/1992 | Hobart et al. | 372/95 |
| 5,150,372 A | 9/1992 | Nourrcier | 372/38 |
| 5,181,217 A * | 1/1993 | Sato et al. | 372/38.05 |
| 5,247,531 A * | 9/1993 | Muller-Horsche | 372/86 |
| 5,313,487 A * | 5/1994 | Fujikawa et al. | 372/86 |
| 5,434,881 A | 7/1995 | Welsch et al. | 372/87 |
| 5,556,549 A | 9/1996 | Patrick et al. | |
| 5,841,096 A | 11/1998 | Takahashi et al. | |
| 5,892,198 A | 4/1999 | Barnes et al. | |
| 6,135,995 A | 10/2000 | Arnett et al. | |
| 6,181,719 B1 | 1/2001 | Sukhman et al. | 372/38.1 |
| 6,392,210 B1 | 5/2002 | Jewett et al. | |

(Continued)

FOREIGN PATENT DOCUMENTS

DE    10024463 A1   11/2001
FR    2579382 A1   9/1986

(Continued)

OTHER PUBLICATIONS

Google search (simmer pulse and RF pulse) pp. 1-2; Sep. 27, 2012.*

(Continued)

*Primary Examiner* — Tod T Van Roy
*Assistant Examiner* — Delma R Forde
(74) *Attorney, Agent, or Firm* — Morrison & Foerster LLP (57) ABSTRACT

A gas discharge laser including a lasing gas between discharge electrodes and has a power supply for generating RF pulses to be delivered to the electrodes of the laser for energizing the lasing gas. A sequence of RF simmer pulses is delivered to the electrodes. The simmer pulses create sufficient free electrons in the lasing gas to facilitate subsequent ignition of the discharge while not causing laser action. RF lasing pulses having a longer duration than the simmer pulses are delivered to the electrodes to ignite the discharge and provide corresponding laser output pulses. Delivery of the simmer pulses is suspended during delivery of the lasing pulses to avoid amplitude or pulse-width modulation of the laser output pulses by the simmer pulses.

9 Claims, 4 Drawing Sheets

U.S. PATENT DOCUMENTS

| | | | |
|---|---|---|---|
| 6,535,540 B1 * | 3/2003 | Kawasuji et al. | 372/86 |
| 6,693,938 B1 * | 2/2004 | Umeda et al. | 372/55 |
| 6,963,596 B2 | 11/2005 | Shackleton et al. | 372/86 |
| 6,987,790 B2 * | 1/2006 | Govorkov et al. | 372/86 |
| 7,308,013 B2 * | 12/2007 | Basting et al. | 372/57 |
| 7,366,213 B2 * | 4/2008 | Govorkov et al. | 372/38.07 |
| 2002/0107510 A1 * | 8/2002 | Andrews et al. | 606/10 |
| 2004/0037339 A1 | 2/2004 | Watson et al. | |
| 2005/0058172 A1 * | 3/2005 | Paetzel et al. | 372/55 |
| 2008/0069170 A1 | 3/2008 | Shackleton et al. | 372/61 |
| 2008/0075640 A1 | 3/2008 | Takeda et al. | |
| 2008/0204134 A1 | 8/2008 | Knickerbocker et al. | |
| 2009/0067467 A1 * | 3/2009 | Gutierrez | 372/55 |
| 2009/0296764 A1 | 12/2009 | Robotham et al. | |

FOREIGN PATENT DOCUMENTS

| | | |
|---|---|---|
| JP | 62-249493 A | 10/1987 |

OTHER PUBLICATIONS

Google search (Joel fontanella and simmer pulse and control or measuring), p. 1; Sep. 27, 2012.*

Google search (simmer and pulse and RF and time and deliver) pp. 1-2; Sep. 27, 2012.*

Google search (simmer pulse and measure time and RF pulse); pp. 1-2; Sep. 27, 2012.*

International Search Report and Written Opinion received for PCT Patent Application No. PCT/US2010/051833, mailed on Apr. 12, 2011, 12 pages.

Fontanella et al., U.S. Appl. No. 12/729,394, filed Mar. 23, 2010, titled as "Smart Simmer Discharge Circuitry".

International Search Report received for PCT Patent Application No. PCT/US2009/043362, mailed on Oct. 2, 2009, 3 pages.

U.S. Appl. No. 61/057,392, filed May 30, 2008, by W. Shef Robotham, Jr. et al., entitled "Frequency Agile RF Power Excitation for Drivint Diffusion Cooled, Sealed Off, RF Excited Gas Lasers".

International Preliminary Report on Patentability received for PCT Patent Application No. PCT/US2009/043362, mailed on Dec. 9, 2010, 8 pages.

International Preliminary Report on Patentability received for PCT Patent Application No. PCT/US2010/051833, mailed on Apr. 26, 2012, 9 pages.

Non Final Office Action received for U.S. Appl. No. 12/729,394, mailed on Jul. 12, 2011, 19 pages.

Non Final Office Action received for U.S. Appl. No. 12/729,394, mailed on Feb. 1, 2012, 12 pages.

Final Office Action received for U.S. Appl. No. 12/729,394, mailed on Sep. 6, 2012, 13 pages.

* cited by examiner

GAS LASER DISCHARGE PRE-IONIZATION USING A SIMMER-DISCHARGE

PRIORITY

The subject application claims priority to provisional application Ser. No. 61/147,199, filed Jan. 26, 2009, the disclosure of which is incorporated herein by reference.

TECHNICAL FIELD OF THE INVENTION

The present invention relates to pre-ionization methods and apparatus for facilitating ignition of a gas discharge. The invention relates in particular to igniting a gas discharge in a radio frequency (RF) excited, hermetically sealed carbon dioxide ($CO_2$) laser.

BACKGROUND

RF-excited, hermetically sealed, pulsed $CO_2$ lasers are gas discharge lasers widely used in material processing and laser machining applications such as via hole drilling in printed circuit boards and glass-plate scribing for TV screen manufacture. Such a laser includes a laser gas mixture including $CO_2$ and inert gases. A gas discharge is ignited in the laser gas to energize the $CO_2$ for providing optical gain. In order to be adaptable to a variety of applications, such a laser should be capable of operating in a wide variety of pulse formats including a wide range of constant pulse repetition frequencies (PRF) to random sequences of changing PRF. An RF-excited, hermetically sealed, pulsed $CO_2$ laser typically requires pre-ionization of the laser gas in order to provide near-immediate ignition of the discharge in response to a user command signal. Delays in this response are commonly referred to as "pulse-time jitter" by practitioners of the art.

In an RF-discharge gas laser the RF resonant circuit (which includes the lasing gas between discharge electrodes) has a high Q and a correspondingly high resonant frequency when the discharge is un-lit. High Q is associated with high impedance at resonance. Once the discharge is lit, the Q drops significantly and the resonant frequency of the RF circuit drops correspondingly. It is easier to achieve ignition of a gas discharge with a high-Q resonant circuit than with a low-Q resonant circuit. This resonant frequency-shift presents a problem in the design of RF excited $CO_2$ lasers, as the frequency of the RF supply to the electrodes must be selected to provide a compromise between optimum ignition effectiveness and efficiency of operation once the discharge is ignited (lit). The problem is complicated by the fact the longer a discharge is not lit the more difficult it is to reignite the discharge. Various approaches have been taken by $CO_2$ laser manufacturers to alleviate this problem.

One recent approach to alleviating the problem involves using a frequency agile RF power supply with an ability to detect the RF resonant frequency with the discharge in un-lit and lit conditions. This is described in U.S. Provisional Application No. 61/057,392, filed May 30, 2008, assigned to the assignee of the present invention. Dual frequency approaches are described in U.S. Pat. No. 6,181,719, and in U.S. Pat. No. 5,150,372.

A limitation of the approaches referenced above is that as the area of the discharge increases, i.e., the area of the discharge electrodes increases, the difference between the resonant frequencies of the lit and un-lit discharge conditions increases. For high-power, slab-type $CO_2$ lasers, for example $CO_2$ lasers having an output power of about 1 kilowatt (kW) or greater, this resonant-frequency difference becomes a significant fraction of the center (nominal) frequency of an RF power supply. By way of example, for a center frequency of 100 MHz, representative of the optimum lit resonant frequency, the unlit discharge resonant frequency can be lower by approximately 25 MHz. This places a difficult design burden in providing an adequate bandwidth to accommodate the frequency difference.

Turning now to a discussion of prior-art pre-ionization approaches, an early prior art approach, described in U.S. Pat. No. 5,434,881, involved the use of an igniter, including an electrode similar to that of a spark plug. This approach requires a separate power supply and a hermetically sealed penetration into the gas enclosure of the laser. These add cost and complexity to a laser. Further, the approach presents a problem inasmuch as the lifetime of the laser is compromised by ablation of the electrode material into the laser gas mixture.

Improvements directed to minimizing the electrode ablation problem are described in U.S. Pat. No. 6,963,596, and in U.S. Pre-Grant Publication No. 2008/0069170, each thereof assigned to the assignee of the present invention. These improvements, however, still require a separate power supply and a hermetically sealed penetration into the gas enclosure of the laser. The above cited patents, published applications and provisional applications are hereby incorporated herein by reference.

One prior-art pre-ionization approach that does not require a separate igniter or a separate power supply involves using the discharge electrodes of the laser to provide pre-ionization in addition to powering the lasing discharge. In this approach, the RF power supply is operated at a single frequency corresponding to the lit-discharge resonant frequency. Pre-ionization is provided by operating the power supply with RF pulses delivered at a pre-selected PRF and short enough in duration not to cause laser action, but long enough in duration to generate sufficient free electrons in the lasing gas to provide the pre-ionization. The pulse length is increased in response to a command signal to provide the main lasing discharge. The pre-ionization discharge is referred to by practitioners of the art as a "simmer-discharge'.

This simmer-discharge approach can be effected by appropriately programming a gate array chip in the RF power supply that is usually contained within a power supply to perform status monitoring tasks or for turning off the power supply if a large voltage standing wave ratio (VSWR) is detected. A large VSWR occurs if the discharge does not light on a user command. A large VSWR can damage the power supply if the power supply is not turned off.

Figure 1:
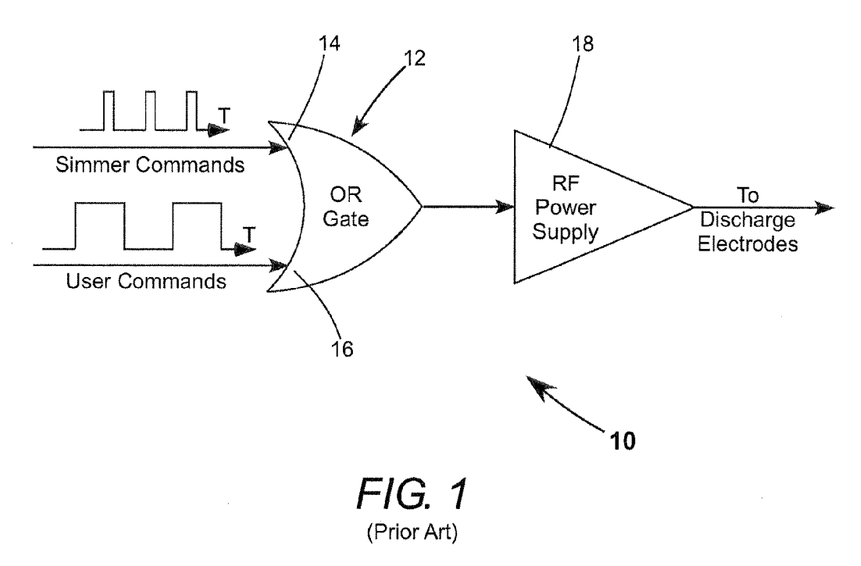
FIG. 1 schematically illustrates a prior-art logic arrangement including an OR-gate arranged to receive simmer command pulses and laser-discharge command pulses and to transmit the command pulses, non exclusively to an RF power supply, the RF power supply being arranged to transmit, non exclusively, simmer RF pulses or laser-discharge RF pulses responsive to the corresponding command pulses.

FIG. 1 schematically illustrates a basic logic arrangement 10 of the above-discussed prior-art pulsed simmer-discharge approach. The logic arrangement includes a logic OR-gate 12, and RF-power supply 18. Short duration simmer command pulses are delivered to input 14 of the OR-gate and from the OR-gate to the RF power supply. The simmer command pulses cause the RF-power supply to deliver simmer RF-pulses of corresponding duration and PRF to laser discharge electrodes (not explicitly shown).

The duration and PRF of the simmer command pulses and corresponding RF simmer pulses are experimentally determined and selected for a given laser design such that the corresponding RF-pulses create and maintain free electrons in the lasing gas to provide pre-ionization but do not excite the lasing gas sufficiently to induce laser action. By way of example, the simmer pulses may have a duration of about 4 microseconds at a PRF of about 1 kilohertz (kHz). The duration and PRF of the simmer pulses are also experimentally selected to minimize time-jitter in lighting the discharge whenever a user command pulse occurs in between the simmer pulses.

Laser-discharge command pulses (user command pulses) are delivered to input 16 of the OR-gate and from the OR-gate to the RF-power supply causing the RF-power supply to deliver corresponding laser-discharge RF-pulse to the laser electrodes. The laser-discharge command pulses, and laser-discharge RF pulses have a much longer duration than the simmer pulses. Typically the simmer and laser-discharge RF pulses will have the same peak power. The PRF of the user command pulses can vary randomly while the PRF of the simmer pulses is fixed, for example at about 1 kHz as discussed above.

One problem with the arrangement of FIG. 1 is that the delivery-frequency to OR-gate 12 of simmer pulses and user command pulses is typically asynchronous. This asynchronous relationship between the simmer and user command pulses causes an amplitude modulation or a pulse width modulation (dependent on the type of RF-power supply employed) to occur on the laser output pulses due to the varying timing relationship between the simmer-discharge command pulses and the laser-discharge command pulses in the composite signal issued by the OR-gate 12. A description of this relationship is set forth below with reference to FIGS. 2A-C.

Figure 2A:
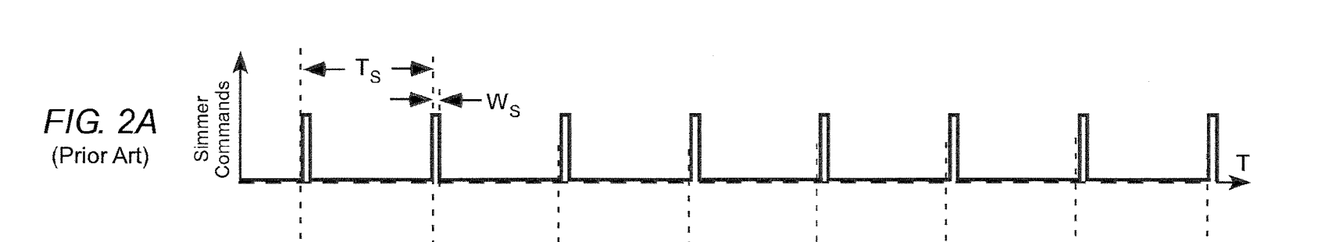
FIG. 2A is a graph schematically illustrating one example of simmer pulse command signals as a function of time delivered to the OR-gate of the prior-art arrangement of FIG. 1.
Figure 2B:
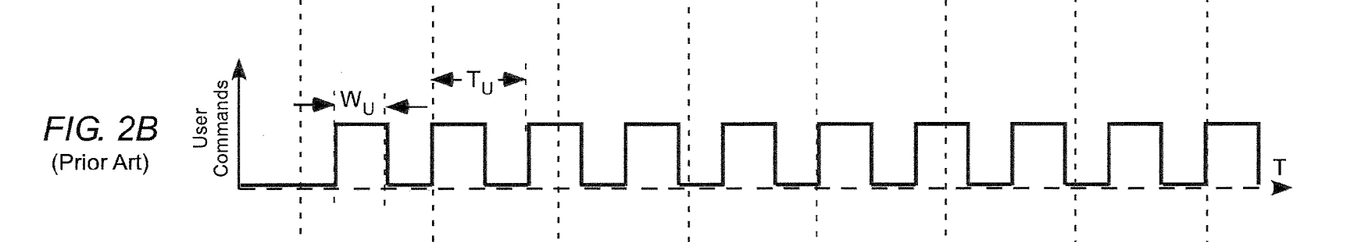
FIG. 2B is a graph schematically illustrating one example of laser pulse (user) command signals as a function of time delivered to the OR-gate of the prior-art arrangement of FIG. 1.
Figure 2C:
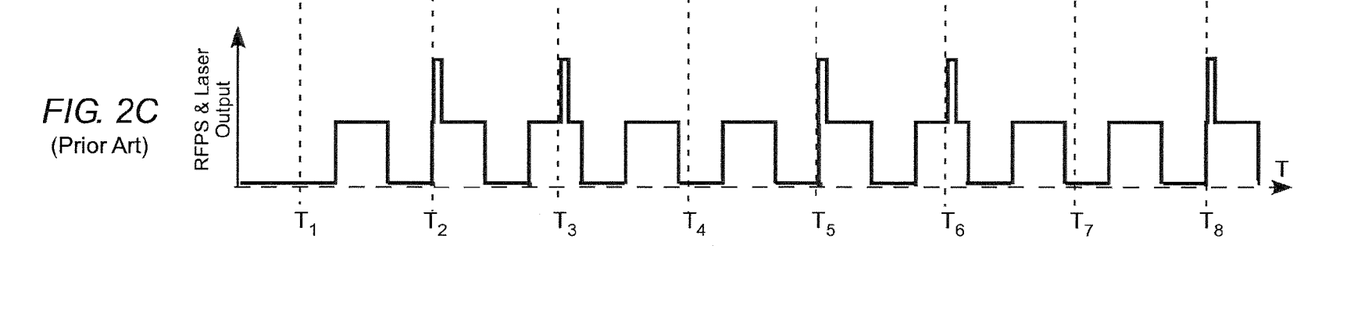
FIG. 2C is a graph schematically illustrating RF output pulses as a function of time delivered by a linear RF power supply in the prior-art arrangement of FIG. 1 in response to receipt of the command signals of FIGS. 2A and 2B.

FIG. 2A is a graph schematically depicting voltage as a function of time for a simmer-discharge command pulse train in the arrangement of FIG. 1. Pulses have a duration $W_S$ and sequential ones thereof are temporally separated by a time period $T_S$. The PRF of the pulses is $1/T_S$. FIG. 2B is a graph schematically depicting voltage as a function of time for a user (lasing) command pulse train in the arrangement of FIG. 1. Pulses have a duration $W_U$, and sequential ones thereof are temporally separated by a time period $T_U$. The PRF of the pulses is $1/T_U$, which in this example is greater than $1/T_S$. FIG. 2C is a graph schematically illustrating laser output pulses as a function of time that would result from the pulse trains of FIGS. 2A and 2B being delivered to a linear RF power supply causing the RF power supply to deliver corresponding RF pulses to the discharge electrodes. At times $T_1$, $T_4$, and $T_7$, when only simmer-discharge pulses are delivered to the electrodes there is no corresponding laser output. At times $T_2$, $T_3$, $T_5$, $T_6$, and $T_8$, the power of the simmer pulses is combined with the power of laser-discharge pulses. As the laser-discharge pulses cause laser output, the laser output power is increased during the period of delivery of the simmer pulse in combination with the laser-discharge pulse, as schematically depicted, causing unwanted amplitude modulation of the output pulses. Gas kinetics of the discharge will modify somewhat the schematic laser output waveform shown in FIG. 2C. The smaller $T_S$ is with respect to $T_U$, the higher the frequency of the modulation. The smaller Ws is with respect to Wu, the less pronounced will be the modulation and visa versa.

It should be noted that FIG. 2C depicts modulation that occurs when a liner RF-power supply is used in the circuitry of FIG. 1. A linear power supply has an output amplitude that varies dependent on the amplitude of an input command signal. A more commonly used RF-power supply is referred to as a digital RF power supply the output amplitude of which is fixed and independent of the amplitude of the command signal. Were such a power supply used in the circuitry of FIG. 1, pulse width modulation would occur whenever simmer pulses occurred near the beginning or end of a user command pulse. In this case the simmer pulses add to the duration of the discharge pulses thereby increasing the amount of energy in discharge pulses and correspondingly energy deposited on a workpiece.

Pulse-width modulation is as undesirable as amplitude modulation in laser processing. There is a need for a simmer-discharge arrangement for providing pre-ionization that does not lead to any form of modulation of the laser output pulses.

SUMMARY OF THE INVENTION

The present invention is directed to a method of operating a gas discharge laser. The laser includes a lasing gas between discharge electrodes and has a power supply for generating RF pulses to be delivered to the electrodes of the laser for energizing the lasing gas. In one aspect the method of the present invention comprises delivering a sequence of RF simmer pulses to the electrodes. The simmer pulses having a duration and pulse-repetition frequency (PRF) such that the simmer pulses create sufficient free electrons in the lasing gas to facilitate subsequent ignition of the discharge, while not causing laser action. One or more RF lasing pulses is selectively delivered to the electrodes. The pulse duration of the lasing pulses is selected such the lasing pulses ignite the discharge and induce laser action in the laser. Delivery of the simmer pulses is suspended prior to delivering the first of the lasing pulses. Delivery of the simmer pulses is resumed if another RF lasing pulse is not delivered within a predetermined time period following completion of the delivery of the prior lasing pulse.

This method is particularly effective when the lasing pulses are delivered in a regular sequence thereof having a PRF different from that of the simmer pulses. Suspension of delivery of the simmer pulses during delivery of the laser pulses avoids amplitude modulation of laser output pulses by the simmer pulses.

DETAILED DESCRIPTION OF THE INVENTION

Figure 3:
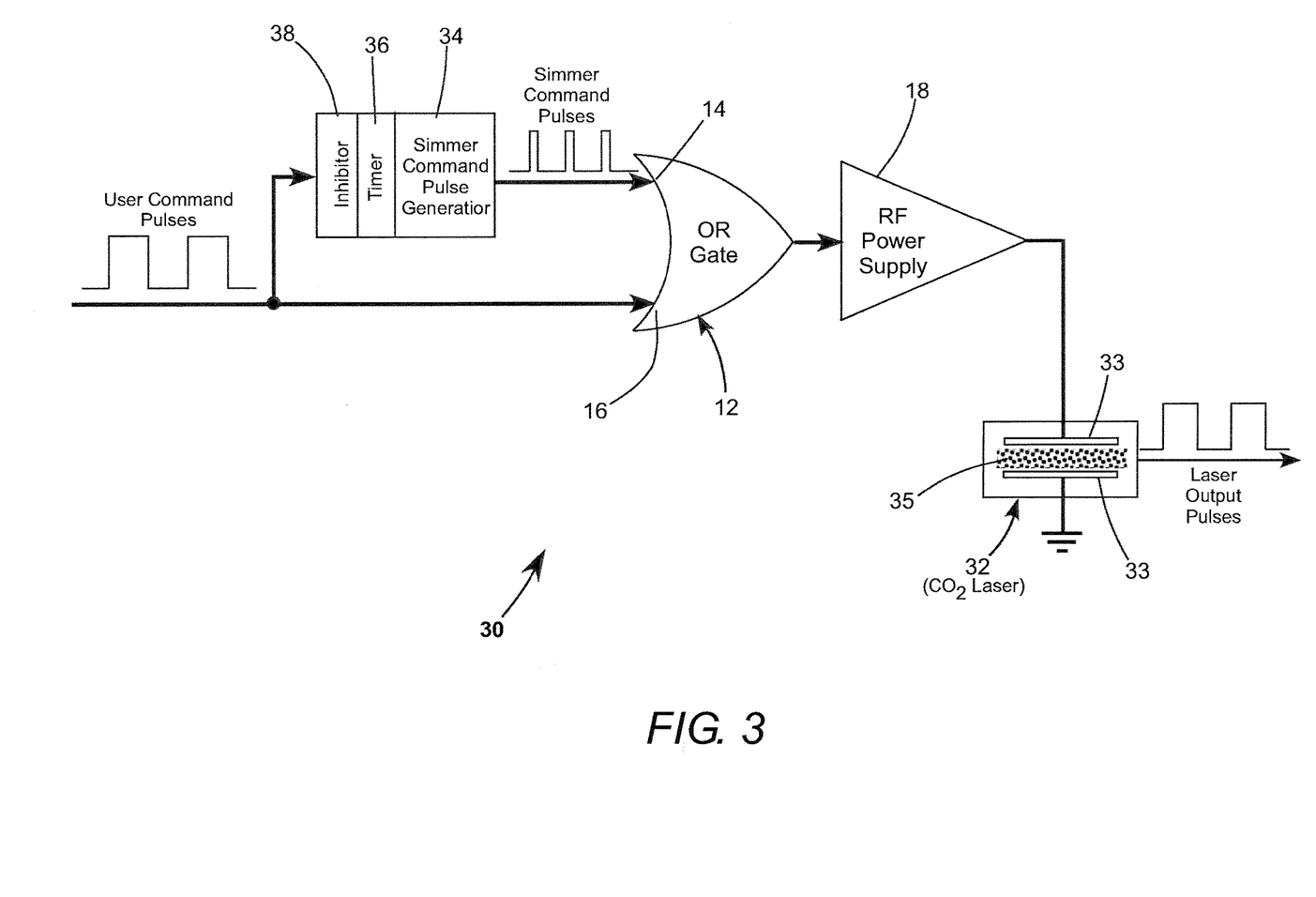
FIG. 3 schematically illustrates in block diagram form a preferred embodiment of circuitry arrangement in accordance with the present invention wherein an OR-gate is arranged to receive simmer command pulses and laser-discharge command pulses and to transmit exclusively either the simmer command pulse or the laser-discharge command to an RF power supply such that the RF power supply delivers to a $CO_2$ laser exclusively either simmer RF pulses or laser-discharge RF pulses.

FIG. 3 schematically illustrates in block diagram form a preferred embodiment 30 of electronic circuitry in accordance with the present invention for providing pre-ionization of a laser discharge. The circuitry is arranged to drive a $CO_2$ laser 32. Laser 32 includes discharge electrodes 33 having a lasing gas (gas-mixture) 35 therebetween. Those skilled in the electronics art, from the detailed description of the present invention set forth below, will understand that there are several means of implementing functions of the circuit blocks to which reference is made. Any of these means may be implemented without departing from the spirit and scope of the present invention. A detailed description of any such means is not required for understanding principles of the present invention and is not presented herein Circuitry 30 includes a simmer command pulse generator 34 arranged to deliver to RF power supply 18 a train of simmer command pulses the PRF of which is determined by a master timer 36. The RF power supply can be a linear or a digital type power supply. The PRF and pulse duration of the simmer command pulses in the train are predetermined for a design of laser 32 such that corresponding RF pulses generated by the RF power supply provide pre-ionization of laser 32 without initiating lasing, as described above with reference to FIG. 1 and FIGS. 2A-C. By way of example for a $CO_2$ slab laser delivering pulses having an average power of about 1 kW, simmer pulses having a duration of about 4 microseconds (µs) delivered at a PRF of about 1 kHz will provide such pre-ionization. A detailed description of the construction of a slab laser is not necessary for understanding principles of the present invention and is not presented herein. A detailed description of such a laser is provided in U.S. Pat. No. 5,123,028 assigned to the assignee of the present invention and the complete disclosure of which is hereby incorporated herein by reference.

Simmer command pulse signals generated by simmer pulse command generator 34 are provided to input 14 of a logic OR-gate 12. User command pulse signals are applied to input 16 of the OR-gate, and also to an inhibitor circuit 38. The purpose of the inhibitor circuit is to stop and reset the timer when a user command pulse arrives. The user command pulse is delivered by the OR-gate to the RF power supply and a corresponding lasing pulse is delivered to laser 32, which, in turn delivers a corresponding laser pulse.

The inhibitor delays the issuance of the next simmer command pulse whenever a user command pulse is received. The timer begins to count elapsed time from the end (trailing edge) of the user command pulse. When the elapsed time counted equals $T_S=1/PRF$, and if another user command pulse has not been received by inhibitor 38, timer 36 allows a simmer command pulse or pulses to again be generated to ensure that lasing gas in laser 32 is adequately pre-ionized should another user command pulse occur. If another user command pulse occurs at some time during the time interval $T_S$, another simmer pulse will not be generated. However, there will be sufficient free electrons in the lasing gas remaining from the previous lasing pulse that the lasing gas will be sufficiently ionized to allow ignition of another lasing discharge with minimal time jitter.

Both simmer pulse signals and user command pulse signals are delivered from OR-gate 12 to RF Power supply 18. In response to receiving these command pulses, the power supply delivers corresponding RF simmer pulses and lasing pulses to electrodes (not shown) of laser 32. Simmer pulses and lasing pulses are never delivered to the laser simultaneously, and the duration of the simmer pulses is too short to excite the laser gas sufficiently to induce laser action.

Figure 4A:
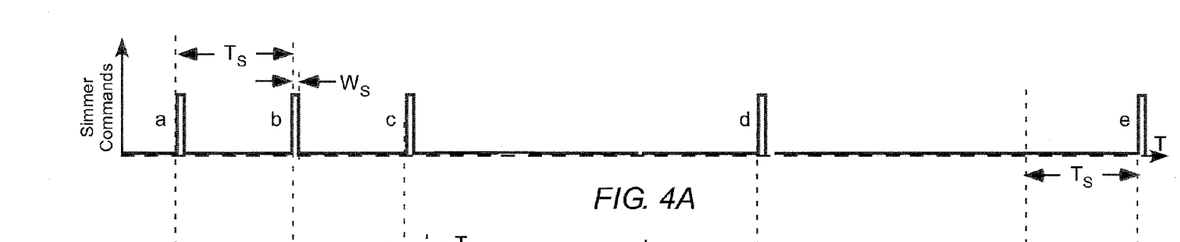
FIG. 4A is a graph schematically illustrating one example of simmer pulse command signals as a function of time transmitted from the OR-gate to the RF power supply in the arrangement of FIG. 3.
Figure 4B:
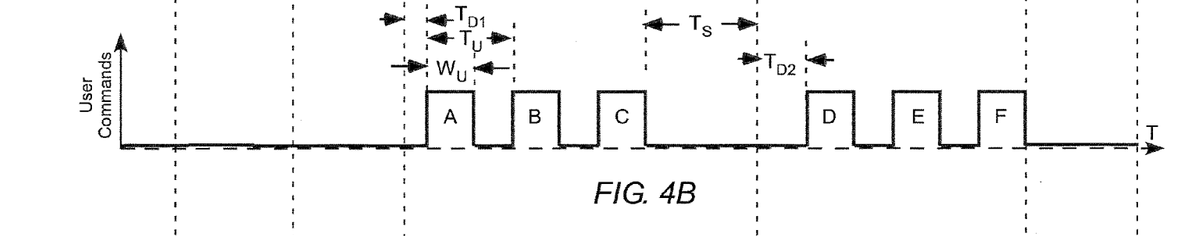
FIG. 4B is a graph schematically illustrating one example of laser-discharge pulse command signals as a function of time transmitted from the OR-gate to the RF power supply in the arrangement of FIG. 3.
Figure 4C:
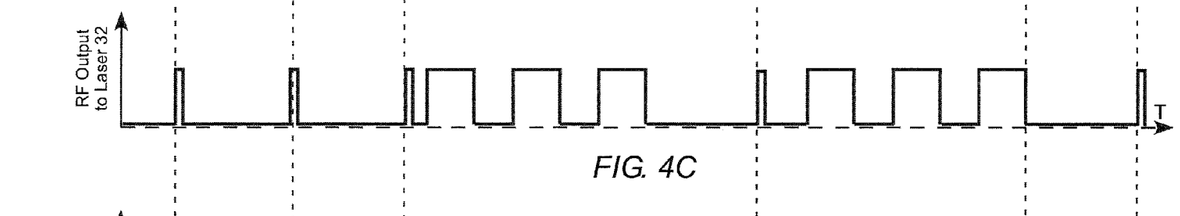
FIG. 4C is a graph schematically illustrating RF pulses as a function of time delivered by the RF power supply to the $CO_2$ laser of FIG. 3 in response to receipt of the command signals of FIGS. 4A and 4B.
Figure 4D:
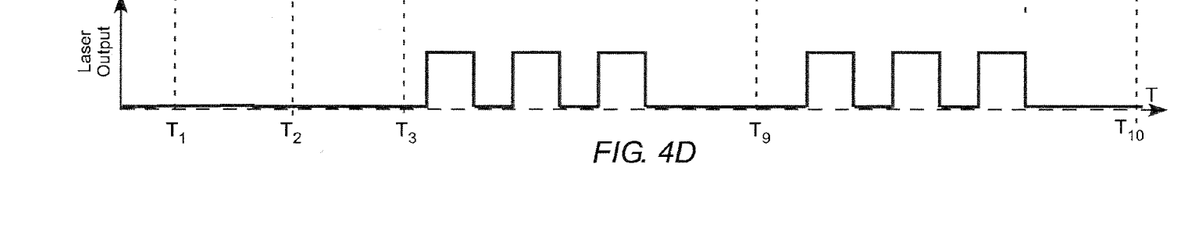
FIG. 4D is a graph schematically illustrating laser output pulses as a function of time delivered by the $CO_2$ laser of FIG. 3 in response to receipt of the RF pulses of FIG. 4C.

The action of circuitry 30 can be followed in detail with reference to FIGS. 4A-D. FIG. 4A is a graph schematically illustrating delivery of simmer command pulse signals to the RF power supply as a function of time by simmer pulse generator 34. FIG. 4B is a graph schematically illustrating delivery of lasing (user) command pulse signals to the RF power supply as a function of time by simmer pulse generator 34. FIG. 4C is a graph schematically illustrating RF pulses delivered by the RF power supply to the laser as a function of time in response to receiving the command pulses of FIGS. 4A and 4B. FIG. 4D is a graph schematically the output of laser 32 as a function of time in response to receiving the RF pulses from the RF power supply, i.e., the RF pulses of FIG. 4C.

Referring first to FIG. 4A, a train of pulses is generated by simmer command pulse generator 34, here represented by three pulses a, b, and c, delivered at times T1, T2, and T3 respectively. The pulses have a duration $W_S$ and are delivered at intervals $T_S$. At a time $T_{D1}$ after the delivery of simmer command pulse c (see FIG. 4B), the first of three user command pulses A, B, and C is received at the inhibitor and at the OR-gate. The user command pulses have a duration $W_U$, have about the same amplitude as the simmer command pulses, and are delivered at intervals $T_U$. The duration $W_U$ is sufficient to cause ignition of a discharge and delivery of a laser pulses of corresponding duration. The leading edge of pulse A stops and resets timer 36. As the period between the delivery of pulses A and B, and B and C is less than $T_S$, no simmer command pulses are generated by the simmer command pulse generator 34 while the user command pulses are being delivered.

Continuing with reference to FIGS. 4A and 4B, at a time $T_9$, occurring after a period $T_S$ following the delivery of (the trailing edge of) user command pulse C, simmer command pulse generator 34 re-starts and attempts to deliver a new train of simmer command pulses. However, at a time $T_{D2}$ after first pulse d of the attempted train is delivered, the first of three user command pulses D, E, and F is received at the inhibitor and at the OR-gate. The leading edge of pulse D again stops and resets timer 36. As a result of this, only the one simmer command pulse d is delivered to the RF power supply. Again, the period between the delivery of pulses D and E, and E and F is less than $T_S$, so no simmer command pulses are generated by the simmer command pulse generator 34 while the user command pulses are being delivered. At a time $T_{10}$, occurring after a period $T_S$ following the delivery of the user command pulse F, simmer command pulse generator 34 again re-starts again to deliver a new train of simmer command pulses, only one of which is depicted in FIG. 4A.

It should be noted, here, that $T_{D1}$ and $T_{D2}$ are not required to be equal, although each will be less than $T_S$. Further, the time period between times $T_9$ and $T_3$, and the time period between times $T_{10}$ and $T_9$, are not necessarily equal to an integer multiple of $T_S$. This is because the generation of simmer command pulses, while at a fixed PRF, stops and then restarts at a time dictated by the delivery of the user command pulses.

Referring next to FIG. 4C the output of RF power supply 18 includes both simmer pulses and lasing pulses having a duration corresponding to the corresponding command signals delivered to the power supply from the OR-gate. Because of the interaction of the inhibitor and timer in the inventive circuitry, however, there will never be any temporal overlap between simmer pulses and lasing pulses. This provides that laser output pulses do not have any amplitude, or pulse-width modulation, as depicted in FIG. 4D. There is no laser output corresponding to the delivery of simmer pulses at times $T_1$, $T_2$, $T_3$, $T_9$, and $T_{10}$.

The example depicted in FIGS. 4A-D is but one example of laser pulse delivery using circuitry in accordance with the present invention. Command pulse trains (and corresponding laser output pulse trains) may have more or less than three pulses therein. Indeed, the laser output can consist of a series of pulses with randomly varying intervals therebetween, with the interval all being greater than $T_S$. In no case, however, will any laser pulse have amplitude or pulse width modulation.

An advantage of the pre-ionization arrangement of the present invention is that the arrangement can be implemented in several high power $CO_2$ slab lasers without providing any additional components. All such lasers include a gate array chip programmed to monitor in real time a voltage standing wave ratio (VSWR) between the RF power supply and the discharge to determine the lit or unlit status of the discharge. If the VSWR is too large, as is the case if the discharge is not lit even though RF power was being provided to the electrodes, the gate array issues a command to shut down the RF power supply to prevent damage to the power supply. One gate array suitable for this task is available as Part No. EPN-3256 from Altera Corporation of San Jose, Calif.

Usually such a gate array is under-utilized in performing only the VSWR monitoring task and has sufficient left over capabilities to also perform the logic task described above with reference to FIG. 3 and FIGS. 4A-D. Because of this, the physical realization of the inventive method requires only programming the gate array without requiring additional hardware to be added to the RF power supply.

In the subject invention, the intent is to block the delivery of simmer pulses to the gas discharge during periods when the laser pulses are being delivered (and for some finite period thereafter). In the illustrated embodiment, this result is achieved by inhibiting the generation of the simmer pulses. Various other approaches could be used that are within the scope of the subject invention. For example, instead of inhibiting the generation of the pulses, one or more logics gates could be inserted between the simmer pulse generator and gate 12 in a manner to block the simmer pulses from reaching gate 12 when the command pulses are being generated. Various other digital logic sequences could be provided as long as the power supply was inhibited from receiving simmer pulses during periods when laser pulses are desired.

In summary, the present invention is described and depicted herein in terms of a preferred embodiment. The invention, however, is not limited to the embodiment described and depicted. Rather the invention is limited only by the claims appended hereto.

What is claimed is:

1. A method of operating a gas discharge laser including a lasing gas between discharge electrodes and having a power supply for generating RF pulses to be delivered to the electrodes of the laser for energizing the lasing gas, the method comprising the steps of:
  (a) delivering a sequence of RF simmer pulses to the electrodes, the simmer pulses having a duration and pulse-repetition frequency (PRF) such that the simmer pulses create sufficient free electrons in the lasing gas to facilitate subsequent ignition of the discharge while not causing laser action;
  (b) selectively delivering one or more RF lasing pulses to the electrodes, the pulse duration of the lasing pulses being selected such the lasing pulses ignite the discharge and induce laser action in the laser;
  (c) suspending delivery of the simmer pulses prior to delivering the first of the lasing pulses;
  (d) measuring the time elapsed following each of the one or more RF lasing pulses;
  (e) if another RF lasing pulse is not delivered within a predetermined time period following completion of the delivery of the prior RF lasing pulse, resuming the delivery of the simmer pulses; and
  (f) repeating steps (b), (c), (d) and (e) to generate sequences of laser output pulses.

2. The method of claim 1, wherein the predetermined time period is equal to the reciprocal of the PRF of the simmer pulses.

3. The method of claim 1, wherein the lasing pulses are delivered in a regular sequence having a PRF different from the PRF of the simmer pulses.

4. A method of operating a gas discharge laser including a lasing gas between discharge electrodes and having a power supply for generating RF pulses to be supplied to the electrodes of the laser for energizing the lasing gas, the method comprising the steps of:
  generating a sequence of simmer command pulses, the simmer command pulses being delivered to the power supply, with the pulse duration and repetition frequency of the simmer command pulses being selected so that RF simmer pulses generated by the power supply in response thereto create sufficient free electrons in the lasing gas to facilitate subsequent ignition the discharge while not causing laser action;
  selectively generating lasing command pulses, the lasing command pulses being delivered to the power supply, with the pulse duration of the lasing command pulses being selected such that RF lasing pulses generated by the power supply in response thereto induce laser action in the laser; and
  temporarily inhibiting the delivery of the RF simmer pulses to the electrodes in response to the initiation of a lasing command pulse, wherein the step of inhibiting the delivery of the RF simmer pulses to the electrodes is performed by inhibiting the generation of the simmer command pulses in response to the initiation of a lasing command pulse.

5. The method as recited in claim 4, wherein the delivery of the simmer command pulses are inhibited for a time period after the end of a lasing command pulse and provided that a subsequent lasing command pulse is not detected prior to said time period elapsing.

6. The method as recited in claim 5, wherein the simmer command pulses are generated at a fixed pulse-repetition frequency (PRF) and the time period after the end of the command pulse is equal to the reciprocal of the PRF.

7. The method as recited in claim 6, wherein generation of simmer command pulses is resumed if the subsequent lasing command pulse is not received during the elapsed time period.

8. A method of operating a gas discharge laser including a lasing gas between discharge electrodes and having a power supply for generating RF pulses to be supplied to the electrodes of the laser for energizing the lasing gas, the method comprising the steps of:

generating a sequence of simmer command pulses at a predetermined pulse-repetition frequency PRF, the simmer command pulses being delivered to the power supply, with the pulse duration and repetition frequency of the simmer command pulses being selected so that RF simmer pulses generated by the power supply in response thereto create sufficient free electrons in the lasing gas to facilitate subsequent ignition the discharge while not causing laser action;

selectively generating one or more lasing command pulses, the lasing command pulses being delivered to the power supply, with the pulse duration of the lasing command pulses being selected such that RF lasing pulses generated by the power supply in response thereto induce laser action in the laser;

inhibiting the delivery of the RF simmer command pulses to the electrodes in response to the beginning of the first of the one or more lasing command pulses;

measuring the time elapsed following the end of each of the one or more lasing command pulses; and if the beginning of another lasing command pulse does not occur within a time period equal to the reciprocal of the PRF, resuming generation of the simmer command pulses.

9. The method of claim 8, wherein the RF simmer pulses and the RF lasing pulses delivered by the RF power supply have about the same peak power.

* * * * *